Feb. 20, 1968

A. A. R. ELAGIB 3,369,402

HYDRAULICALLY BALANCED BRIDGE FOR MEASURING
TEMPERATURE DIFFERENCES
Filed May 28, 1965

Inventor
AHMED A. R. EL AGIB

By *Rupert J. Brady*
Attorney

United States Patent Office 3,369,402
Patented Feb. 20, 1968

3,369,402
HYDRAULICALLY BALANCED BRIDGE FOR MEASURING TEMPERATURE DIFFERENCES
Ahmed A. R. Elagib, Khartoum, Sudan, assignor of one-half to The University of Khartoum
Filed May 28, 1965, Ser. No. 459,640
2 Claims. (Cl. 73—342)

ABSTRACT OF THE DISCLOSURE

A bridge having temperature-sensitive resistance elements as arms, two of which are in a fluid flowing through a pipe at points the temperature difference of which is to be measured. The other two arms are in a pipe having a fluid flow and are separated by an adjustable throttling device, the amount of throttling necessary to balance the bridge being an indication of the temperature difference to be measured.

---

Figure 1:
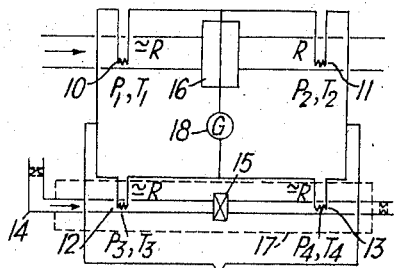
Figure 2:
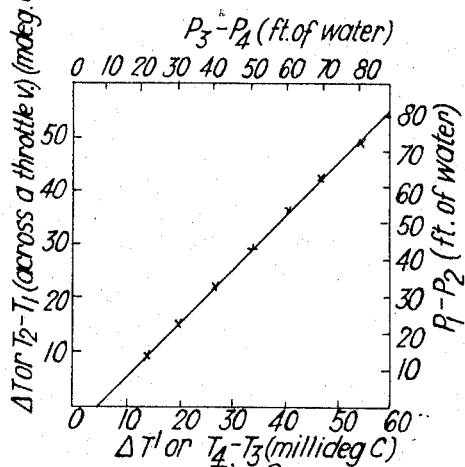
Figure 3:
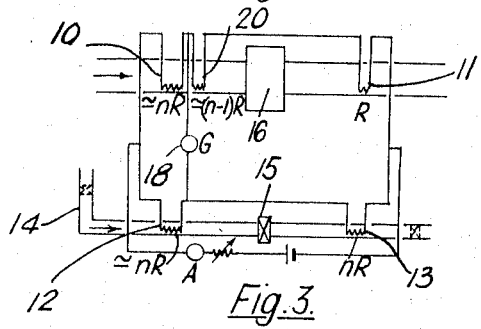

Embodiments of the invention will now be described, by way of example, with reference to the accompanying drawings, in which:

FIG. 1 is a diagrammatic representation of hydraulic bridge according to the invention consisting of four resistance thermometers arranged in the form of a Wheatstone bridge;

FIG. 2 is a graph of a typical calibration curve of $\Delta T$ or $T_2-T_1$ (across a throttle valve) in milli deg. C., against $\Delta T^1$ or $T_4-T_3$ in milli deg. C., a hydraulic bridge according to the invention; and FIG. 3 is a diagrammatic representation of a modified embodiment of a hydraulic bridge according to the present invention.

Referring now to FIG. 1, a hydraulic bridge according to the invention consists of four resistance thermometers arranged in the form of a Wheatstone bridge. Two outer thermometers 10 and 11 are the temperature probes and are placed at the measuring points. Two inner thermometers 12 and 13 are used for balancing the bridge, and are placed in a pipe 14 of flowing water, one on each side of a throttle valve 15. Instead of the heretofore proposed method of balancing by knob-operated resistances, the bridge is balanced entirely by manipulation of the throttle-valve and hence the heating or cooling of the thermometer 13 downstream of it. By noting the pressure difference across the valve, the temperature difference sensed by the outer thermometers 10 and 11 can be computed or obtained from the calibration chart of the bridge.

From the principles of resistance thermometry it can be proved that at balance of the bridge $$\Delta T = m\Delta T^1 - C \quad (1)$$

where $\Delta T$ and $\Delta T^1$ are the temperature differences across a machine 16 and the valve respectively (FIG. 1). The machine may be a pump, turbine or a cooler.

$$m = \frac{(R_0)_1(R_0)_4(1+a_1T_1)(1+a_4T_3)(1/a_2+T_1)}{(R_0)_2(R_0)_3(1+a_2T_1)(1+a_3T_3)(1/a_4+T_3)} \quad (2)$$

and $$C = \left\{1 - \frac{(R_0)_1(R_0)_4(1+a_1T_1)(1+a_4T_3)}{(R_0)_2(R_0)_3(1+a_2T_1)(1+a_3T_3)}\right\}(1/a_2+T_1) \quad (3)$$

The subscripts 1, 2, 3 and 4 refer to the thermometers placed (or the measurements made) in the respective points in FIG. 1.

The term $bT^2$ in the basic equation of platinum resistance thermometers $$R_T = R_0(1+aT+bT^2)$$

is neglected because of the coefficient $b$ is small compared with $a$ ($-5.86 \times 10^{-7}$ compared with $3.98 \times 10^{-3}$) and has insignificant effect on the validity of the following arguments.

From the structure of Equation 2 for $m$, if each pair of the thermometers used have nearly equal values of $a$, then $m$ can be considered as constant. The same argument applies to the first bracket in the equation for C. In the second bracket $1/a_2$, for platinum is about 250, hence a variation of 2.5 deg. C. in the temperature of the fluid causes only 1% variation in C. Thus C can be assumed constant for the period of one series of tests (unless an exceptional variation of fluid temperature is noted) and Equation 1 may be considered as linear. The calibration curve in FIG. 2 confirms this deduction. A simple method for the experimental determination of $m$ and C is described hereinafter.

Assuming negligible heat transfer between the water and surroundings, and that the bridge's pipe 14 is uniform and horizontal, $\Delta T^1$ the temperature change across the throttle-valve in FIG. 1, can be expressed by $$\Delta T^1 = T_4 - T_3 = \frac{A_{T_2}}{C_{P_4}}(P_3 - P_4) \quad (4)$$

where $$A_{T_3} = \frac{1}{P_3-P_4}\int_{P_4}^{P_3}\left(\frac{\delta h}{\delta P}\right)_{T_3}\delta P =$$
$$\frac{1}{P_3-P_4}\int_{P_4}^{P_3}\left\{v - T_a\left(\frac{\delta V}{\delta T}\right)_P\right\}\delta P \quad (5)$$

$$C_P = \frac{1}{T_4-T_3}\int_{T_3}^{T_4}\left(\frac{\delta h}{\delta T}\right)_{P_4}\delta T = \text{the average specific heat} \quad (6)$$

T, P, h and v are the temperature, pressure, enthalpy and specific volume respectively.

By substituting for $\Delta T^1$ from Equation 4, Equation 1 becomes $$\Delta T = m\frac{A_{T_3}}{C_{P_4}}(P_3-P_4) - C \quad (7)$$

Equation 7 shows the relation between the pressure drop across the throttle-valve and the temperature difference sensed by the probes at balance of the bridge.

To determine the values of $m$ and C in Equation 7 the bridge is calibrated using another auxiliary throttling valve in place of the machine 16 in FIG. 1. By this throttling valve exact temperature difference can be created, against which the bridge may be calibrated. (FIG. 2 is a typical calibration chart.) The values of these exact temperature differences are determined by the relation shown in Equation 4.

An integral bridge unit may be made consisting of two throttling valves fitted in two parallel pipes in the same insulation box 17 (FIG. 1). Thus this bridge unit will be "self-calibrating."

For the daily checking of the value of C, the thermometers 10 and 11 (or 12 and 13), may be placed at the same pocket or adjacent pockets in the hydraulic circuit so that $\Delta T=0$. Thus from Equation 7

$$C = m\frac{A_T}{C_P}\Delta_P \qquad (8)$$

The thermometers selected must have equal or nearly equal values of $R_0$, or the pairs must have as nearly identical ratios of $R_0$ as possible. This will give a small value of C and no pressure is wasted in initial balancing, e.g. an inequality of 0.01% in one of the 100Ω thermometers used in the bridge will require to be balanced by about 38 ft. of water (equivalent to about 0.025 deg. C. of the value of C).

The effect of lead resistance is eliminated by use of leads having the same resistance ratio as the thermometers, e.g.

$$\frac{R_1}{R_2} = r = \frac{l_1}{l_2}\frac{R_1}{R_2} = \frac{R_1+l_1}{R_2+l_2} \qquad (9)$$

In the case of this bridge $r$ is approximately equal to unity (to within 0.01%); hence leads of equal resistance are used. Four-core cables are chosen. Each cable contains two pairs of leads belonging, one to an inlet and one to an outlet thermometer (or one to an outer and one to an inner thermometer). Thus the leads are not only equal but follow each other and hence are at the same ambient temperature throughout their length. As usual single-wire leads are used to avoid the risk of broken strands.

To avoid the value of C being increased by inequality of the leads, the leads must be matched separately and their lengths readjusted if necessary.

The manner of operation of the apparatus according to the invention will now be described. Four 100Ω platinum-in-Pyrex (Reg. TM.) resistance thermometers with equal $a$ values are selected. They are fitted in alumina-packed nickel sheaths and are inserted in 5/8 in. water-filled copper pockets which are fitted into the pipe. The pipe is embedded in a long wooden box filled with a thermal insulating material "Polyzote" (Reg. TM.). (It has been found, however, that heat transfer has little effect if the water used is nearly at the room temperature.)

Water is supplied to the throttle valve 15 through a pipe 14 branched off the main outer hydraulic circuit (FIG. 1). Thus all the thermometers are basically at about the same temperature. The pressure difference across the valve is measured by a simple mercury manometer.

A stabilized D.C. supply is used and a current of 1 ma. is maintained through the thermometers. The galvanometer 18 used is fitted with a photocell amplifier. The effect of stray thermal E.M.F. is nullified by the usual method of current reversing.

As a guide to the pressure requirement of the bridge, the measurement of a temperature difference of 0.100 deg. C. requires a differential head of about 150 ft. of water at the bridge. This figure is obtained by using Equation 7 for water at room temperature and assuming that $C=0$ and $m=1$.

In this case the temperature measuring capacity of the bridge is 1:1, i.e. the temperature difference across the valve is of the same order as that to be measured.

The rate of response of the bridge to the valve manipulation is dependent on the rate of discharge through the valve, and on the heat capacity and conductivity of the thermometer pockets. It is found that for a discharge of 50 gal. min.$^{-1}$ the bridge responds to the manipulation of the valve in about 10 to 20 seconds. By suitable amplification of the signal to the galvanometer, the bridge discriminates or senses a change of about 0.3 milli deg. C. Theoretically the sensitivity is comparable with that of a conventional bridge consisting of resistance boxes with an infinite number of decades, but practically it is limited by the pressure fluctuations in the hydraulic system. The ultimate accuracy is dependent on the stability of the circuit and the resistance thermometers. If this stability can be maintained an accuracy to that order (0.3 milli deg. C.) may be achieved. The table shows the results of a typical test.

MEASUREMENT OF TEMPERATURE DIFFERENCE ACROSS A THROTTLE VALVE BY THE HYDRAULIC BRIDGE

| Test No. | ΔT (milli deg. C.=0.001 deg. C.) | |
|---|---|---|
| | (1) | (2) |
| 1 | 6.5 | 6.4 |
| 2 | 12.5 | 12.0 |
| 3 | 20.2 | 19.8 |
| 4 | 27.7 | 27.4 |
| 5 | 35.2 | 35.3 |
| 6 | 42.9 | 42.6 |

(1) Calculated from pressure measurements.
(2) Measured by the hydraulic bridge.

It can be seen from Equation 5 that the temperature measuring capacity of the bridge is limited by the pressure difference ΔP available at the throttle valve, and the ratio $A_T/C_P$ of the fluid used for the valve circuit $(A_T/C_P = -(\delta T/\delta P)_h$ where $(\delta T/\delta P)_h$ is the Joule-Thomson coefficient).

The value of $A_T/C_P$ for water at 4° C. is about $1.67 \times 10^{-3}$ deg. C. per lb. in.$^{-2}$ or $7 \times 10^{-4}$ deg. C. per foot head of water. Amongst common fluids, water has numerically the lowest ratio $A_T/C_P$. It provides the least temperature-pressure measuring capacity if used for the valve circuit, but it has many obvious advantages over other fluids, e.g. oils or steam. In many cases, however, it will be found preferable to use the same fluid as that used in the main circuit; then at least about 1:1 temperature measuring capacity is obtained.

A very useful method of greatly increasing the temperature measuring capacity of the bridge is to change the values of $m$ by using the thermometer arrangement shown in FIG. 3 which illustrates a further embodiment of the invention. In this embodiment reference numerals 20, 10 and 11 denote resistance thermometers, which act as temperature probes, and reference numerals 12 and 13 denote resistance thermometers placed in a pipe 14 of flowing water, one on either side of a throttle valve 15. It is to be noted that resistance thermometers 20 and 11 are on opposite sides of the machine while being in the same leg of the bridge. A galvanometer is denoted 18, and a machine 16, as in FIG. 1.

Advantages of the hydraulic bridge according to the present invention are:
  the temperatrue measurements are reduced to simple pressure measurements, and the manipulation of resistance decade-knobs is replaced by fine and smooth hydraulic heating of the thermometers;
  all the main resistances are at one basic temperature;
  it is self-calibrating, and
  it provides a simple and cheap means for precise measurement of small temperature difference.

The bridge is useful in many scientific and engineering fields where measurement of small temperature difference is necessary. A promising application is its use for the determination of the efficiency of hydraulic machines by the thermodynamic methods where the difficulty of measuring small temperature difference is the main handicap. In such hydraulic installations a pressurized water supply for the hydraulic bridge is readily obtainable.

I claim:

1. An electrical bridge for measuring temperature differences, comprising at least four resistance thermometers arranged in the form of a Wheatstone bridge, a pipe containing a flowing liquid and a throttle valve situated at a position along the length of the pipe, wherein at least two of said thermometers are temperature probes positioned at the points whose temperature difference is to be measured and at least another two of said thermometers are placed in the pipe with at least one of the latter thermometers on each side of the throttle valve, and said throttle valve being adjustable to modify the resistance ratio of the second recited set of resistance thermometers in order to make said ratio equal to the corresponding ratio of the first recited set of thermometers and thereby balance the bridge.

2. A method of measuring temperature differences comprising, connecting at least four resistance thermometers in the form of a Wheatstone bridge circuit with at least two of said thermometers as temperature probes at points whose temperature difference is to measured, creating a flow of liquid past at least another two of said thermometers remote from said first mentioned thermometers, without affecting the first two thermometers and balancing said bridge circuit by throttling said flow intermediate said two latter thermometers to modify the resistance ratio of the second recited set of resistance thermometers in order to make said ratio equal to the corresponding ratio of the first recited set of thermometers.

References Cited
UNITED STATES PATENTS

| 3,147,618 | 9/1964 | Benson | 73—204 |
| 3,251,225 | 5/1966 | Luft | 73—204 |

FOREIGN PATENTS 78,970           Germany.

LOUIS R. PRINCE, *Primary Examiner.*

F. SCHOON, *Assistant Examiner.*